United States Patent
Puett, Jr.

[11] Patent Number: 6,119,802
[45] Date of Patent: Sep. 19, 2000

[54] HYDRAULIC DRIVE SYSTEM FOR A VEHICLE

[75] Inventor: Edwin E. Puett, Jr., Stuart, Fla.

[73] Assignee: Anser, Inc., Stuart, Fla.

[21] Appl. No.: 08/930,306

[22] PCT Filed: Apr. 25, 1996

[86] PCT No.: PCT/US96/05330

§ 371 Date: Oct. 22, 1997

§ 102(e) Date: Oct. 22, 1997

[87] PCT Pub. No.: WO96/33883

PCT Pub. Date: Oct. 31, 1996

Related U.S. Application Data

[63] Continuation-in-part of application No. 08/430,243, Apr. 28, 1995, Pat. No. 5,607,027.

[51] Int. Cl.$^7$ .................................................. B60L 17/356
[52] U.S. Cl. .......................... 180/242; 180/308; 60/427; 60/459
[58] Field of Search ..................... 180/165, 242, 180/53.4, 247, 305, 308; 60/427, 459, 489

[56] References Cited

U.S. PATENT DOCUMENTS

| | | |
|---|---|---|
| 1,156,818 | 10/1915 | Rich . |
| 2,496,497 | 2/1950 | Russell . |
| 2,547,578 | 4/1951 | Holmes . |
| 2,933,158 | 4/1960 | Pitts . |
| 3,091,930 | 6/1963 | Thoma et al. . |
| 3,092,970 | 6/1963 | Sampietro . |
| 3,256,950 | 6/1966 | De Biasi . |
| 3,369,360 | 2/1968 | De Biasi . |
| 3,442,344 | 5/1969 | Ocule . |
| 3,448,577 | 6/1969 | Crawford . |
| 3,459,393 | 8/1969 | Thomas . |
| 3,498,420 | 3/1970 | Fawick . |
| 3,509,721 | 5/1970 | Crawford . |
| 3,700,060 | 10/1972 | Keene et al. . |
| 3,724,583 | 4/1973 | Caldwell . |
| 3,734,225 | 5/1973 | Kobald et al. . |
| 3,892,283 | 7/1975 | Johnson . |
| 3,900,075 | 8/1975 | Chichester et al. . |
| 3,951,222 | 4/1976 | Fletcher . |
| 4,023,641 | 5/1977 | Ganoung . |
| 4,063,608 | 12/1977 | Sullivan . |
| 4,098,083 | 7/1978 | Carman . |
| 4,140,196 | 2/1979 | Brewer . |
| 4,215,545 | 8/1980 | Morello et al. . |
| 4,242,922 | 1/1981 | Baudoin . |
| 4,350,220 | 9/1982 | Carman . |
| 4,373,605 | 2/1983 | Sheppard, Sr. . |
| 4,382,484 | 5/1983 | Anderson et al. . |
| 4,387,783 | 6/1983 | Carman . |
| 4,441,573 | 4/1984 | Carman et al. . |
| 4,484,655 | 11/1984 | Sheppard, Sr. . |
| 4,570,741 | 2/1986 | McCoy . |
| 4,745,745 | 5/1988 | Hagin . |
| 4,766,727 | 8/1988 | Dull et al. . |
| 4,813,510 | 3/1989 | Lexen . |
| 4,903,792 | 2/1990 | Ze-ying . |

(List continued on next page.)

*Primary Examiner*—Paul N. Dickson
*Assistant Examiner*—Lynda Jasmin
*Attorney, Agent, or Firm*—Everett G. Diederiks, Jr.

[57] ABSTRACT

A hydraulic drive system for a vehicle includes a pressurizing circuit and a working circuit. The pressurizing circuit incorporates a pump driven by a prime mover having a nominal horsepower rating. The prime mover is either shut off or idled when the pressure sensed within the pressurizing circuit is within a desired range and run at an optimum high RPM range when the pressure falls below the desired range. At least one accumulator is provided in the pressurizing circuit. The working circuit includes a plurality of motors for driving at least one vehicle wheel and a motor control valve arrangement which isolates one or more motors from the flow of pressurized fluid while deactivated and drives the motors while activated. As vehicle speed increases and drive resistance decreases, the number of motors propelling the vehicle is progressively reduced. A flow control valve alters flow to the motors.

18 Claims, 6 Drawing Sheets

U.S. PATENT DOCUMENTS

| | | |
|---|---|---|
| 4,986,383 | 1/1991 | Evans . |
| 5,062,498 | 11/1991 | Tobias . |
| 5,168,703 | 12/1992 | Tobias . |
| 5,230,402 | 7/1993 | Clark et al. . |
| 5,263,401 | 11/1993 | Walker . |
| 5,505,527 | 4/1996 | Gray, Jr. et al. ........................ 180/165 |
| 5,540,299 | 7/1996 | Tohda et al. ............................ 180/242 |
| 5,682,958 | 11/1997 | Kalhorn et al. ......................... 180/308 |
| 5,692,377 | 12/1997 | Moriya et al. ............................ 60/427 |
| 5,715,664 | 2/1998 | Sallstrom et al. ...................... 180/242 |
| 5,720,360 | 2/1998 | Clark et al. ............................ 180/305 |
| 5,794,422 | 8/1998 | Reimers et al. ........................ 180/165 |
| 5,794,734 | 8/1998 | Fahl et al. ............................... 180/165 |

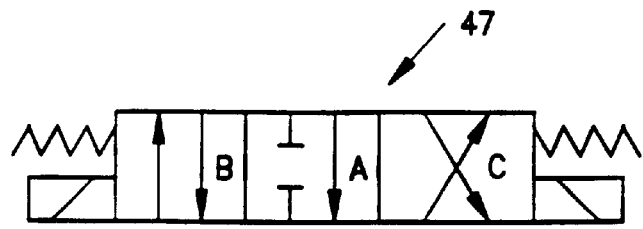
FIG. 2
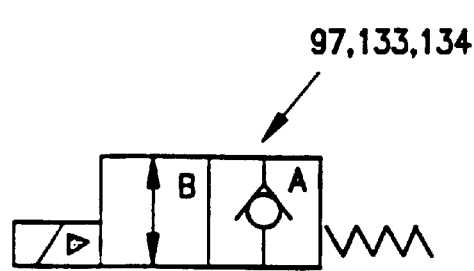
FIG. 3
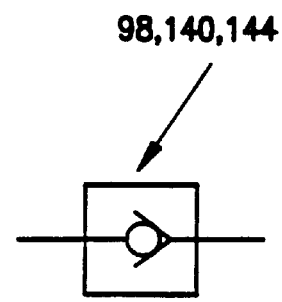
FIG. 4
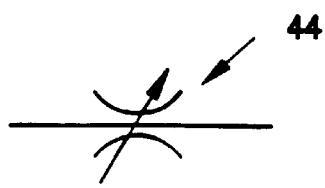
FIG. 5
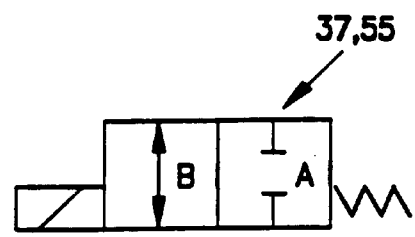
FIG. 6
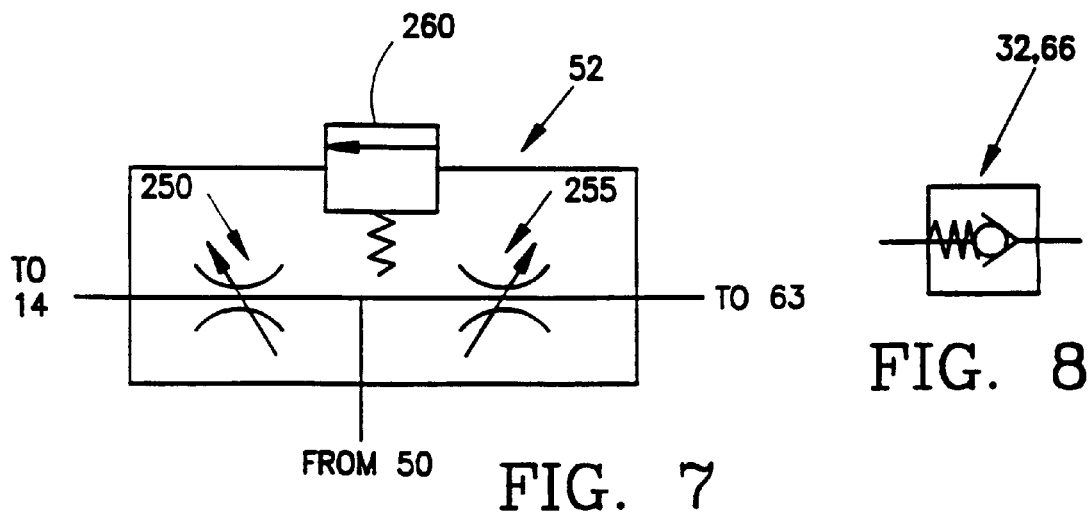
FIG. 7
FIG. 8

HYDRAULIC DRIVE SYSTEM FOR A VEHICLE

This application is a continuation-in-part of prior U.S. patent application Ser. No. 430,243, filed Apr. 28, 1995, now U.S. Pat. No. 5,607,027.

BACKGROUND OF THE INVENTION

1. Field of the Invention

The present invention pertains to the art of vehicles and, more particularly, to a hydraulic drive system for a vehicle.

2. Discussion of the Prior Art

Hydraulic drive systems for vehicles are known in the art. Most notably is the use of hydraulic drive systems on earthworking vehicles and other heavy machinery which operate in high torque/low speed environments. However, it has also been heretofore proposed to incorporate such drive systems on passenger vehicles.

In designing a new drive system for a vehicle, one must carefully weigh the efficiency advantages of the drive system against its associated cost. Because of these considerations, initial attempts at hydraulic drive systems have generally concentrated on combining a conventional drivetrain with a hydraulic power system. More specifically, the internal combustion engine and transmission assembly is retained and the output thereof drives a pump which supplies the necessary fluid to the hydraulic power system. A major advantage of such an arrangement is that the vehicle can be readily assimilated into the marketplace since the driving characteristics, as seen from a driver of the vehicle, is essentially unchanged. Unfortunately, the cost associated with such vehicles is much higher than conventional internal combustion engine driven vehicles and therefore these hydraulically driven vehicles have not been commercially successful.

Other known system designs obviate the need for a conventional transmission and simply permit the internal combustion engine to directly drive a pump used to supply hydraulic fluid to the system. In these known systems, a conventional accelerator or throttle member is controlled by the operator in order to adjust the operating speed of the engine and, generally, the engine is systematically started and stopped depending on sensed system pressure. The problem with these known systems is that they cannot be readily assimilated into the marketplace, they are rather costly given the fact the internal combustion engines (or correspondingly sized electric motors) are large (generally commensurate in horsepower ratings to conventional vehicle engines) and they are not efficient as compared to alternative drivetrains.

SUMMARY OF THE INVENTION

The basic objects of the present invention are to provide a hydraulic drive system for a vehicle wherein the system will be user-friendly so as to not require any additional training for use and will represent a drive system that exceeds potential alternatives with respect to operation efficiency. In addition, when applied to a passenger vehicle, the system will meet or exceed current standards with respect to acceleration, speed, handling, operating noise, dependability and cost; exhibit an increase in current mileage standards; and significantly reduce undesirable emissions.

These objects have been achieved by developing a hydraulic drive system that has a design generally based on volume instead of pressure. According to the invention, multiple drive units are drivingly connected to the vehicle wheels and torque requirements are met by the addition and subtraction of the number of drive units receiving fluid from a pump. With this arrangement, system pressure need only be maintained in an acceptable range. System pressure is developed by driving the pump by means of a power source or prime mover which can be constituted by an internal combustion engine that utilizes gasoline, propane, natural gas etc. or an electric motor. System pressure is built-up and maintained in an accumulator for use as needed.

In a preferred embodiment incorporating an internal combustion engine used to develop system pressure to four driven wheels, when additional system pressure is required, a pressure sensor triggers a speed regulator for the engine to increase the RPMs of the engine to an optimal running speed. When system pressure is again established within an acceptable range, the engine is automatically idled. As indicated above, shifting of the vehicle occurs by adding or subtracting the number of drive units used to drive the wheels. For instance, as the vehicle is first accelerated, all the drive units are driven and, as the vehicle speed increases, the supply of working fluid to successive drive units can be cut-off. This operation is performed automatically through the use of valving and is based on a sensed operating pressure or other sensed operating parameters. The operator can define the shifting parameters in a manner analogous to conventional automobiles as well. For instance, in an automatic version of the present hydraulic drive system applied to a passenger vehicle, a shift control lever can be placed in a drive (D) position for shifting through all drive ranges with only one or two drive units being supplied with working fluid in the highest speed range, a low (D2) position which permits only certain of the drive units to be isolated from the working fluid, and a lower (D1) position which essentially constitutes a high torque drive mode wherein all the drive units are engaged. Positioning of the shift control lever actually functions to actuate a predetermined set of drive unit control valves in each selected position. A manual shifting embodiment simply permits the driver to control the number of drive units being engaged by directly actuating a predetermined set of drive unit control valves, so long as the system working pressure is within defined limits.

The vehicle operator controls the acceleration and speed of the vehicle by operating a conventional control member such as a lever or accelerator pedal. However, this control member does not directly control the throttling of the engine. Instead, the control member directly controls the position of a flow control valve arranged between the accumulator and the drive units. By allowing the system to control the prime mover, as opposed to the prime mover controlling the system or the operator directly controlling the prime mover, a variety of prime movers can be readily incorporated in the overall drive system. In addition, due to pressure requirements given the system components and design, a significantly smaller prime mover is required (generally within a comparable operating range of approximately 10–50 HP for a conventional passenger vehicle while being commensurately higher for other types of vehicles) to operate the vehicle within desired torque, acceleration and speed ranges. Obviously, this reduction in engine weight and cost, in addition to the fact that no conventionally known transmission and drivetrain assembly is required, greatly reduces the associated weight of the vehicle and leads to increased mileage with reduced emissions. In fact, test results have indicated gasoline mileages many times higher than those of conventional vehicle drive systems, particularly in local, stop-and-go type travel conditions. When a commensurate sized electric motor is utilized, a corresponding increase in mileage range between charges would also be realized.

Additional objects, features and advantages of the hydraulic drive system of the present invention will become more readily apparent from the following description of preferred embodiments of the invention when taken in conjunction with the drawings wherein like reference numerals refer to corresponding parts in the several views.

BRIEF DESCRIPTION OF THE DRAWINGS

FIG. 2 is a schematic of a multi-position solenoid directional flow control valve incorporated in the hydraulic circuit of FIG. 1.

FIG. 3 is a schematic view illustrating a preferred embodiment of motor control valves incorporated in the hydraulic circuit of FIG. 1.

FIG. 4 schematically illustrates a check valve arrangement incorporated in the hydraulic circuit of FIG. 1.

FIG. 5 schematically represents a preferred embodiment of a non-compensated flow control valve incorporated in the hydraulic circuit of FIG. 1.

FIG. 6 represents another solenoid control valve incorporated in the hydraulic circuit of FIG. 1.

FIG. 7 schematically illustrates a spring loaded directional flow control valve with pressure release incorporated in the hydraulic circuit of FIG. 1.

FIG. 8 schematically illustrates another type of check valve incorporated in the hydraulic circuit if FIG. 1.

DETAILED DESCRIPTION OF THE PREFERRED EMBODIMENTS

Figure 1:
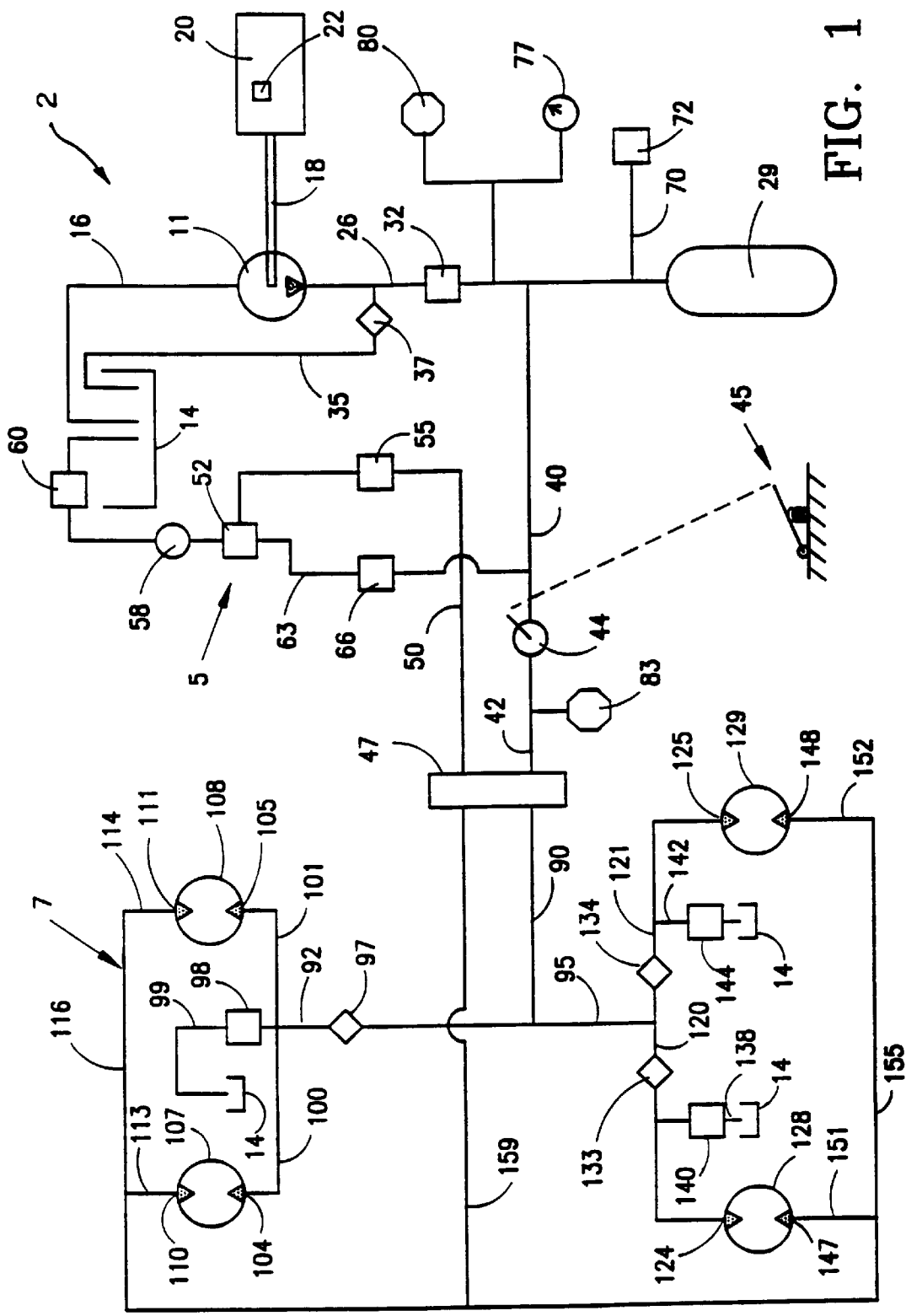
FIG. 1 is a schematic diagram of a first preferred hydraulic circuit embodiment including both pressure and working circuits for the hydraulic drive system of the present invention.

With initial reference to FIG. 1, a schematic of an hydraulic circuit for the drive system 2 of the present invention is illustrated. This hydraulic circuit is generally composed of a pressurizing circuit 5 and a working circuit 7. Pressurizing circuit 5 includes a pump 11 that is fluidly interconnected with a reservoir 14 through an inlet line 16. Pump 11 can be constituted by a fixed displacement pump or a variable displacement pump. If a variable displacement pump is utilized, it is preferable to have a rather tight displacement range, for example, a pump having a displacement range of approximately 0.49–0.59 in$^3$. Pump 11 is driven by the output shaft 18 of a prime mover 20. Prime mover 20 can be constituted by an internal combustion engine that utilizes gasoline, propane, natural gas, etc. or an electric motor. Due to the overall construction of hydraulic drive system 2, prime mover 20 is considerably smaller than conventional passenger vehicle prime movers. More specifically, prime mover 20 has a horsepower rating generally in the order of 10–100 HP. For example, if the hydraulic drive system is incorporated in a conventionally sized passenger vehicle, a gas driven internal combustion engine having a horsepower rating of 12–18 HP is utilized and, with a large earthworking vehicle, a horsepower rating of approximately 50–75 is needed. When an internal combustion engine is utilized as prime mover 20, it is preferable to have prime mover 20 encased in a water cooling jacket, such as utilized on some known motorcycles and the like, in order to reduce undesirable noises. The operating speed of prime mover 20 is controlled by means of a speed regulating unit 22 which in the preferred embodiment functions to shift prime mover between two positions, i.e., an idling position and an optimum high range RPM position as will be more fully discussed below.

Pump 11 is also fluidly connected to an output line 26 that is directly connected to an accumulator 29. Although only a single accumulator 29 is depicted in FIG. 1, a bank of accumulators could be provided depending upon the size of the accumulators and the desired storage capacity for the system. In a preferred embodiment of the invention wherein the hydraulic drive system is incorporated in a standard passenger car, a nitrogen gas charged accumulator 29 having a capacity of approximately 10 gallons of hydraulic fluid is utilized. Interposed between pump 11 and accumulator 29 within outlet line 26 is a one-way check valve 32 which only enables flow from pump 11 toward accumulator 29. Connected to output line 26 is also a bypass line 35. Interposed in bypass line 35 is a two-position valve 37. In the preferred embodiment, valve 37 constitutes a solenoid valve having a first position which blocks the flow of pressurized fluid in output line 26 from being re-directed to reservoir 14 through bypass line 35 and a second position which permits such flow. The specific manner in which valve 37 is controlled will be more fully discussed below, however, in general, valve 37 permits this bypass flow when prime mover 20 is idling and prevents flow through bypass line 35 when the speed of prime mover 20 is increased to an optimum high RPM.

Pressurized fluid from pump 11 and accumulator 29 leads to a main pressure supply line 40 for hydraulic drive system 2. Main pressure supply line 40 includes a terminal portion 42 and has disposed therealong a flow control valve 44. As will be more fully discussed below, flow control valve 44 regulates the flow out of pressurizing circuit 5 based on the position of an adjustable vehicle control member 45, such as an accelerator pedal on a conventional passenger vehicle, a lever on a fork-lift truck or the like, that is actuated by an operator of the vehicle. Terminal portion 42 of main pressure supply line 40 leads to a multi-position, directional flow control valve 47 which interconnects pressurizing circuit 5 with working circuit 7.

Pressurizing circuit 5 also includes a return line 50 that leads from directional flow control valve 47 to reservoir 14. Within return line 50 is located a flow re-directing valve 52 which functions to fluidly interconnect return line 50 with main pressure supply line 40 during braking of the vehicle as will also be more fully described below. Interposed in return line 50, between directional flow control valve 47 and flow re-directing valve 52, is a two-position valve 55. In the preferred embodiment, two-position valve 55 constitutes a solenoid valve that is normally closed and which is opened during operation of the vehicle in any drive mode. Also interposed in return line 50, between flow re-directing valve 52 and reservoir 14, is a filter 58 and an oil cooler 60. Oil cooler 60 preferably constitutes an air cooled heat exchanger arrangement which functions to cool the temperature of the hydraulic fluid utilized in the hydraulic drive system 2 of the present invention upon return of the oil to reservoir 14. Also stemming from flow re-directing valve 52 is an auxiliary pressure line 63 which is connected to main pressure supply line 40. Interposed in auxiliary pressure line 63, between flow re-directing valve 52 and main pressure supply line 40, is a check valve 66 which only permits flow in the direction from flow re-directing valve 52 toward main pressure supply line 40.

Pressurizing circuit 5 may also be provided with one or more power take-off (PTO) lines 70 leading to supplemental vehicle operating units such as that indicated at 72. These supplemental vehicle operating units 72 can constitute, for example, power steering units, alternators and the like that operate utilizing the pressure maintained within pressurizing circuit 5. Also connected in pressurizing circuit 5, downstream of pump 11, is a pressure gauge 77. This gauge, although unnecessary in the operation of the hydraulic drive system 2, is preferably provided as an indication to the operator of the vehicle of the pressure within main pressure supply line 40. Finally, pressurizing circuit 5 also includes two pressure sensitive relay switches 80 and 83. The first pressure sensitive relay switch 80 is interconnected in pressurizing circuit 5 so as to be directly responsive to the pressure within accumulator 29 and main pressure supply line 40. Second pressure sensitive relay switch 83 is interposed between flow control valve 44 and directional flow control valve 47. First and second pressure sensitive relay switches 80 and 83 function to automatically control the position of various valves incorporated in hydraulic drive system 2 as will be more fully described below in discussing the various operating modes of hydraulic drive system 2.

In the embodiment illustrated in FIG. 1, working circuit 7 includes a main working line 90 that leads to first and second branch flow lines 92 and 95. In the embodiment illustrated in FIG. 1, a two-position front wheel motor control valve 97 is positioned within first branch flow line 92. First branch flow line 92 leads to reservoir 14 through a check valve 98 and a first suction line 99. The specific construction of check valve 98 will be more fully described below with reference to FIG. 4, however, it should be understood that this check valve allows total free flow in the direction of flow from reservoir 14 into first branch flow line 92 and prevents flow directly to reservoir 14. In the preferred embodiment, check valve 98 does not incorporate a tension spring as commonly found in check valves such that a certain resistance does not need to be overcome before the valve permits the desired flow. First branch flow line 92 leads to working conduits 100 and 101 which, in turn, lead to respective first fluid ports 104 and 105 of forward motor units 107 and 108 respectively. Forward motor units 107 and 108 have respective second fluid ports 110 and 111 which lead to lines 113 and 114. Lines 113 and 114, in turn, lead to a common conduit 116.

In a substantially similar manner, second branch flow line 95 leads to working conduits 120 and 121 that are respectively connected to first and second fluid ports 124 and 125 of rear motor units 128 and 129. At this point, it should be recognized that each of the motor units 107, 108, 128 and 129 in this embodiment are directly drivingly connected to a respective wheel of the vehicle. Interposed between second branch flow line 95 and first fluid port 124 for rear motor unit 128 is a two-position rear motor control valve 133. Likewise, a second two-position rear motor control valve 134 is interposed between second branch flow line 95 and fluid port 125 for rear motor unit 129. Located between rear motor control valve 133 and rear motor unit 128 is a second suction line 138 that is connected to reservoir 14 and which has interposed therein a check valve 140 which is constructed identical to check valve 98. Working conduit 121 is similarly connected to a third suction line 142 and reservoir 14 through a corresponding check valve 144. Rear motor units 128 and 129 include respective second fluid ports 147 and 148 that lead through lines 151 and 152 to a common conduit 155. Common conduits 116 and 155 meet to form an auxiliary working pressure line 159. As clearly shown in FIG. 1, main working line 90 and auxiliary working line 159 lead to directional flow control valve 47 and can be selectively isolated from or interconnected with the pressurized fluid in pressurizing circuit 5 during the operation of the vehicle.

Before detailing the manner in which the hydraulic drive system of the above-described embodiment of the present invention functions to drive a vehicle through various drive ranges, the preferred construction of each of the valves and switches described above will be provided with reference to FIGS. 2–8. FIG. 2 illustrates a preferred construction for directional flow control valve 47. As previously indicated, directional flow control valve 47 is preferably comprised of a three-position solenoid control valve. Directional flow control valve 47 is biased into a central position designated at A wherein main working line 90 of working circuit 7 is isolated from main pressure supply line 40 of pressurizing circuit 5 and auxiliary working line 159 is connected to return line 50. During operation of the vehicle in a forward drive mode, directional flow control valve 47 is shifted to the position indicated at B such that main pressure supply line 40 is directly fluidly connected to main working line 90 and auxiliary working pressure line 159 remains fluidly connected with return line 50. When the vehicle is placed in a reverse operating mode, directional flow control valve 47 assumes position C wherein auxiliary working pressure line 159 is fluidly interconnected with main pressure supply line 40 and main working line 90 is interconnected with return line 50. The specific manner in which directional flow control valve 47 is controlled to shift between the various positions A, B and C will be described more fully below in describing the manner of operation of hydraulic drive system 2.

Reference will now be made to FIG. 3 which illustrates a preferred construction of each of the motor control valves 97, 133 and 134. As indicated above, these valves are preferably constituted by two-position solenoid control valves which are biased in a direction wherein these valves assume a position indicated in FIG. 3 at A. In this position, motor control valves 97, 133 and 134 constitute check valves which only permit flow therethrough from respective motors 107 and 108, 128 and 129 toward first and second branch flow lines 92 and 95. Therefore, when motor control valve 97, 133 and 134 are in position A, any pressurized fluid within first and second branch flow lines 92 and 95 are not permitted to flow into motor units 107, 108, 128 and 129. When any of valves 97, 133 and 134 are shifted to their respective positions B, fluid is permitted to flow from the respective branch flow lines 92 and 95 to the respective motors 107, 108, 128 and 129. As will be discussed more fully below, these motor control valves 97, 133 and 134 are individually controlled to selectively determine which of the motor units 107, 108, 128 and 129 are driven at any given time during operation of the vehicle.

FIG. 4 illustrates the preferred construction of check valves 98, 140 and 144. As previously indicated, these check valves are not spring biased such that predetermined resistances do not have to be overcome prior to opening of the valve. Again, these valves are utilized to interconnect reservoir 14 to the respective working conduits 100, 101, 120 and 121. These check valves only permit fluid to flow from the reservoir toward the working conduits and not vice versa.

FIG. 5 illustrates a preferred construction of flow control valve 44. As schematically illustrated, flow control valve 44 constitutes a needle-type flow restrictor that is provided with fine adjustment and which is mechanically linked to accelerator pedal 45. This type of flow control valve is readily available in the market and can constitute, for example, model No. FCV7-10 (NVF) flow valve sold by VICKERS. Flow control valve 44 is biased to a closed position to prevent flow therethrough unless control member 45 is actuated by the vehicle operator. Although flow control valve 44 is mechanically connected to control member 45, it should be readily understood that an electronic controlled valve arrangement could also be utilized wherein the degree of depression of control member 45 is measured and that sensed degree of depression is utilized to electrically control the opening of flow control valve 44. Therefore, flow control valve 44 can be mechanically connected to control member 45 or electronically controlled based on the position of control member 45.

FIG. 6 illustrates the preferred embodiment for valves 37 and 55. As indicated above, these valves preferably constitute two-position normally closed solenoid valves. Therefore, these valves are biased to assume position A wherein they prevent the flow of fluid therethrough. However, these valves can be activated to shift to the positions indicated at B to permit the free flow of fluid therethrough. The manner in which these valves operate to shift between positions A and B will again be described more fully below in describing the operation of hydraulic drive system 2 in the various drive modes.

A schematic of flow re-directing valve 52 is presented in FIG. 7 and illustrates how the flow from return line 50 is normally directed to reservoir 14 through a first flow control valve 250. However, as will be more fully discussed below, when the vehicle is braked, first flow control valve 250 is simultaneously shifted with a second flow control valve 255 such that the amount of flow through return line 50 to reservoir 14 is decreased and a flow to auxiliary pressure line 63 is provided. During hard braking conditions, the pressure within return line 50 will increase and also the percentage of flow to auxiliary pressure line 63 will correspondingly increase. Pressure relief in the form of spring biased valve 260 is also provided within re-directing valve 52 such that pressure relief valve 260 will cause flow to reservoir 14 if the pressure within working circuit 5, as reflected in auxiliary pressure line 63, exceeds the maximum operating pressure of the system. This operating pressure can vary depending upon preset system parameters, but in the preferred embodiment of a passenger vehicle, this operating pressure is approximately 3,000 psi. Whenever the brake pedal of the vehicle is released, first and second flow control valves 250 and 255 will assume their normal operating positions wherein flow control valve 255 will be closed to prevent interconnection between return line 50 and auxiliary pressure line 63 and the flow from return line 50 will simply be drained to reservoir 14. Further details of this braking operation will be provided below in discussing the overall operation of drive system 2.

FIG. 8 schematically illustrates the construction of check valves 32 and 66. In general, check valves 32 and 66 are constructed in the manner similar to that of check valves 98, 140 and 144, however, these check valves are preferably spring biased to a closed position such that a certain pressure resistance must be overcome in order to permit the flow of fluid therethrough. Check valve 66 is actually interposed within auxiliary pressure line 63 in order to prevent undesirable leakage of pressure within pressurizing circuit 5. More specifically, check valve 66 functions to prevent pressurizing fluid within main pressure supply line 40 from leaking into reservoir 14 through flow re-directing valve 52. Of course, flow re-directing valve 52 could itself incorporate a valving arrangement which functions to prevent this reverse flow and therefore check valve 66 would be unnecessary or provided merely as a precautionary measure.

Relay switches 80 and 83 are conventionally known and simply function to complete circuits for controlling solenoid activation based on predetermined sensed pressure levels. More specifically, relay switches 80 and 83, as will be described more fully below, function to control regulating unit 22, valve 37 and one or more motor control valves 97, 134. In the preferred embodiment, pressure sensitive relay switches 80 and 83 are each capable of relaying two different circuits off one supply line such that pressure sensitive relay switch 80 can control regulating unit 22 to either have prime mover 20 in an idle position when the pressure within accumulator 29 and main pressure supply line 40 is within a predetermined operating pressure range (e.g., approximately 2500–3000 psi) and to control regulating unit 22 to increase the operating speed of prime mover 20 to an upper, optimum RPM when the pressure within accumulator 29 and main pressure supply line 40 falls below the desired range. Although in the preferred embodiment prime mover 20 is only shifted between an idling and optimum RPM running speeds based on system pressure, it would be possible to have pressure sensitive relay switch 80 also control prime mover 20 to be shut down when pressurizing circuit 5 is in a high capacity pressure range. However, this alternative embodiment will create vibrations and additional disturbances inherent in periodically re-starting prime mover 20. As will be more fully described below, second pressure sensitive relay switch 83 is capable of relaying at different sensed operating pressures between flow control valve 44 and directional flow control valve 47 to specifically control the shifting of motor control valves 97 and 134.

Figure 9:
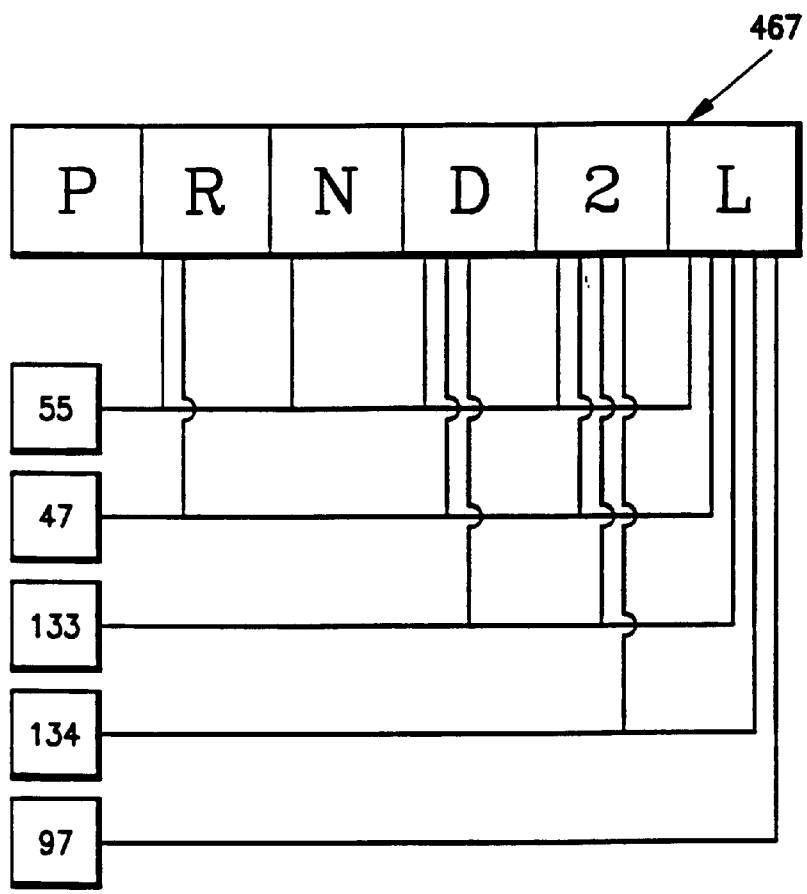
FIG. 9 illustrates the interrelationship between a gear shift lever position indicator and the valves represented in FIGS. 2, 3 and 6.

The functioning of hydraulic drive system 2 in the various operating modes will now be described with specific reference to FIGS. 1 and 9, while keeping in mind the structure and available positions and functions of the valves and switches illustrated in FIGS. 2–8. FIG. 9 will be utilized to illustrate the operation of hydraulic drive system 2 in connection with an automatic drive arrangement similar to those of conventional passenger vehicles wherein a operator controlled shift lever is used to selectively determine the mode of operation of the vehicle between park, reverse, neutral and various forward drive positions. Of course, other types of vehicles could have similar shift levers providing at least reverse and forward drive positions. FIG. 9 illustrates a conventional passenger vehicle type shift control lever position indicator at 467. When the gear shift lever is placed in the park (P) position, all of the solenoid valves incorporated in the hydraulic drive system 2 are simply biased to their neutral positions and therefore pressurizing circuit 5 is isolated from working circuit 7, except that auxiliary working line 159 is connected to return line 50 but isolated from reservoir 14 by means of valve 55, and no flow is permitted through motor units 107, 108, 128 and 129.

When the manual shift control lever is moved to the reverse (R) position, an electrical contact is made which causes directional flow control valve 47 to shift to position C and for solenoid valve 55 to shift to position B. Shifting of directional flow control valve 47 thereby interconnects main pressure supply line 40 with auxiliary working pressure line 159, as well as interconnecting main working line 90 to reservoir 14 through return line 50. In this mode of operation, pressurized fluid flowing through main pressure supply line 40 into auxiliary working line 159 leads to common conduits 116 and 155 and then to lines 113, 114, 151 and 152 in order to drive motor units 107, 108, 128 and 129 in reverse direction. Fluid flowing through motor units 107, 108, 128 and 129 will flow through the respective check valves of motor control valves 97, 133 and 134 since these motor control valves are in position A of FIG. 3. The fluid flowing through motor control valves 97, 133 and 134 leads to main working line 90 and then will be directed through return line 50 to reservoir 14 due to the position of directional flow control valve 47.

Since re-directing valve 52 is maintained in an operating state wherein no flow will be directed to auxiliary pressure line 63, all of the return flow will go through filter 58 and oil cooler 60. The speed at which the vehicle will be driven in reverse is controlled by the vehicle operator through control member 45 and its interconnection with flow control valve 44. Simply stated, the more the operator depresses control member 45, the higher the rate of flow through directional flow control valve 47 and the corresponding motor units 107, 108, 128 and 129. During this entire sequence, so long as the pressure within pressurizing circuit 5 is maintained within the predetermined operating level which is approximately 2500–3000 psi in the preferred embodiment, prime mover 20 will remain at idle. In fact, if pressurizing circuit 5 is initially, sufficiently pressurized, the vehicle can be initially driven without even starting prime mover 20. If prime mover 20 is idling, valve 37 will be maintained in position A illustrated in FIG. 6 to bypass output flow from fixed displacement pump 11 to reservoir 14 through bypass line 35 so as to unload prime mover 20. At this point it should be additionally noted that in the preferred embodiment, valve 37 is linked to the vehicle's starter switch such that valve 37 will be positioned to unload prime mover 20 during starting but will be fully controlled in the manner set forth herein thereafter. From the above, it should also be readily apparent that each of the vehicle wheels are driven in reverse which provides the maximum torque available according to this hydraulic drive system.

When the shift control lever is moved to the neutral position, directional flow control valve 47 again assumes position A wherein working circuit 7 is isolated from pressurizing circuit 5. In this condition, the vehicle is allowed to free wheel since motor units 107, 108, 128 and 129 can draw fluid from reservoir 14 directly through suction lines 99, 138 and 142 respectively. Outputs from motor units 107, 108, 128 and 129 will flow from common conduits 116 and 155 to auxiliary working line 159, through directional flow control valve 47 since it is in its respective position A, into return line 50 and to the reservoir 14 since solenoid valve 55 is shifted to position B as indicated in FIG. 6.

In the normal drive mode, solenoid valve 55 remains in its B position, directional flow control valve 47 is shifted to the B position wherein main pressure supply line 40 is directly connected to main working line 90 and auxiliary working line 159 is directly connected to return line 50, and rear motor control valve 133 is shifted to position B so as to directly interconnect branch line 95 with motor 128. Again, the operator of the vehicle controls the desired speed/acceleration through control member 45 shifting flow control valve 44. If the vehicle is initially starting out from a stop position, the vehicle wheels will experience a high torsional resistance and this will affect the pressure within terminal portion 42 of main pressure supply line 40. This increase in pressure in terminal portion 42 will be sensed by second pressure sensitive relay switch 83. Pressure sensitive switch 83 will then function, at a pressure approximately equal to 2000 psi in the embodiment described, to actuate solenoid valve 134 so as to shift this valve to its respective operating position B as shown in FIG. 3 such that flow will also go through working conduit 121 and the wheel associated with motor unit 129 will also be driven. In this two wheel drive mode, flow from the motor units 128 and 129 will again flow within common conduit 155, to auxiliary working pressure line 159, through directional flow control valve 47 into return line 50 and through valve 55 and re-directing valve 52 to reservoir 14. Obviously, this flow also goes through filter 58 and oil cooler 60.

If the pressure within terminal portion 42 exceeds a second preset threshold limit (approximately 2400 psi), pressure sensitive switch 83 will also actuate motor control valve 97 which will permit the flow of pressurized fluid through first branch flow line 92, working conduits 100 and 101 and motor units 107 and 108 will thereby drive the additional vehicle wheels. Therefore, it should be recognized that when the vehicle is started from an initial stop position, given that the associated torsional resistance is highest in this stopped position, the vehicle will assume the four wheel drive mode until the pressure within terminal portion 42 drops below the upper threshold as sensed by pressure sensitive switch 83 whereupon motor control valve 97 will again be shifted to its associated position A and only the two motor units 128 and 129 will be driving the vehicle. By this time, the vehicle would have assumed a much higher speed and, in a similar fashion, when the pressure within terminal portion 32 drops below the lower threshold pressure of approximately 2000 psi due to the absence of a major back pressure being created in main working line 90, motor control valve 134 will be de-activated and will assume its associated position A. At this higher vehicle speed, only motor 128 will be driving the vehicle until higher demands are made on the system based on gradients over which the vehicle is traveling, desired speed/acceleration by the operator or the like.

With the arrangement as described above, it should be readily apparent that a vehicle incorporating the hydraulic drive system 2 represented in FIG. 1 will be driven through 3 speed ranges represented by the number of wheels being driven. Of course, this number of ranges can be changed such that a four speed is provided by simply configuring the flow to motors 107 and 108 in the identical manner illustrated with respect to motors 128 and 129. Therefore, an additional motor control valve will be needed and pressure sensitive relay switch 83 will operate to control three separate such motor control valves at approximately 200 psi intervals between 2000 and 2400 psi. In addition, a two speed embodiment could be readily made by arranging the flow to motors 128 and 129 in the identical manner set forth with respect to motors 107 and 108. Since a single motor control valve 97 is utilized to control the flow to motors 107 and 108, it should be readily apparent that a single motor unit having a transverse output shaft connected to a pair of laterally spaced wheels of the vehicle could be provided. Additional exemplary drive arrangements will also be described more fully below with reference to FIGS. 11 and 12. Furthermore, it should be readily apparent that a manual shifting arrangement could be utilized wherein movement of the gear shift between first, second and third forward speeds would directly control the engagement and disengagement of the various motor units. In such an embodiment, it is still preferable to have an automatic override of the operator controls based on system pressure through the use of a pressure sensitive relay switch that operates in the manner set forth above with respect to pressure sensitive relay switch 83. Finally, it should be recognized that the order in which the vehicle wheels are driven could be changed such that at least one front wheel is initially driven.

When the pressure within pressurizing circuit 5 falls out of a desired operating range (e.g. below approximately 2500 psi) during operation of the vehicle, this is sensed by pressure sensitive relay switch 80 and relayed to regulating unit 22. Therefore, when pressurizing circuit 5 has a reduced pressure, regulating unit 22 is adjusted to shift the operating speed of prime mover 20 to an optimum high RPM range such that fixed displacement pump 11 will be driven with an increased output flow to enhance the pressurization of pressurizing circuit 5. Based on the above, it should be readily apparent that the hydraulic drive system 2 of the present invention is based on volume, i.e., the number of drive motors engaged is dependent upon the flow of permissible fluid therethrough since the operation of the vehicle during high torque resistance modes will create a back pressure to increase the number of motors and, as the vehicle speed increases with a corresponding decrease in resistance torque, the number of drive motors is reduced. Therefore, the system is based on volume and the pressure of the system need only be maintained within a desired operating range. This obviates the need to have a high horsepower output prime mover and to run the prime mover constantly.

The output from pump 11 is prevented from directly returning to reservoir 14 while prime mover 20 is operating at the high RPM range because two-position valve 37 is in the position designated as A in FIG. 6. Pressure sensitive relay switch 80 also controls the position of valve 37 along with regulating unit 22. More specifically, pressure sensitive relay switch 80 controls valve 37 to shift the valve to the position indicated at B in FIG. 6 thereby permitting fluid to flow from pump 11 back to the reservoir when prime mover 20 is idling, as discussed above, thereby reducing any load on prime mover 20. Of course, pressurizing circuit 5 still maintains a high pressure in main pressure supply line 40 since accumulator 29 is located upstream of check valve 32. Therefore, when regulating unit 22 is positioned such that prime mover is idled, valve 37 permits flow from pump 11 to reservoir 14 and when regulating unit 22 increases the operating speed of prime mover 20 to a high optimum RPM, valve 37 is simultaneously closed such that it assume the position A as shown in FIG. 6 whereby all of the output from pump 11 flows through check valve 32 to increase the pressure within accumulator 29. Of course, if a variable displacement pump is utilized, the pump will automatically adjust itself such that a higher volume output will be provided at times of lower pressure and less volume will be provided when the system pressure is higher. This will tend to further unload prime mover 20 during times of idling.

Figure 10:
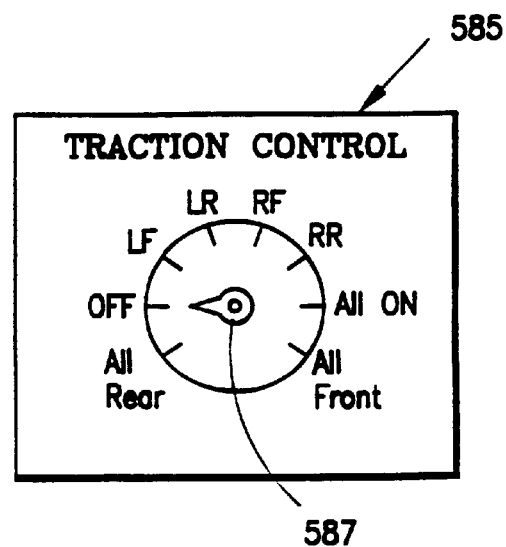
FIG. 10 illustrates a traction control console switch incorporated in the hydraulic drive system of the present invention.

In accordance with another feature of the present invention, the vehicle can include a traction control unit generally indicated at 585 in FIG. 10 wherein the operator can override the system and forcibly maintain any one or all of the vehicle drive motors in operation so long as the vehicle is not in the parked mode. This can be done by a simple rotatable knob 587 or the like which can be manually shifted by the operator. It should be noted that the present invention also incorporates a regenerative braking feature such that, during braking of the vehicle, motor units 107, 108, 128 and 129 will act as pumps and kinetic energy lost during braking will be transformed to potential energy by at least partially re-pressurizing pressurizing circuit 5. As discussed above, re-directing valve 52 is normally in a neutral position allowing free flow of fluid from return line 50 to reservoir 14 through filter 58 and cooler 60 but re-directing valve 52 can be controlled through its connection to the vehicle brake lever or pedal (as described above but not shown) such that re-directing valve 52 acts as a metered flow compensator. As operator pressure is applied to the brake lever or pedal, re-directing valve 52 is controlled to disburse fluid at a metered rate into auxiliary pressure line 63 so as to direct a supply of auxiliary pressure to main pressure supply line 40. As indicated above, during braking, motor units 107, 108, 128 and 129 meet high resistance and actually start operating as pumps that are turned by the momentum of the vehicle wheels engaging the ground. The pressure developed in auxiliary pressure supply line 63 therefore creates a resistance to the rotation of the vehicle wheels. When accumulator 29 is at a high pressure range, a pressure relief arrangement within re-directing valve 52 (pressure relief valve 260 as discussed above) provides pressure relief to the system so that maximum resistance is still being applied to the drive units 107, 108, 128 and 129 such that maximum braking effect occurs but the excess fluid that can no longer be accepted by the accumulator 29 is permitted to flow to reservoir 14. During braking, since motor control valves 97, 133 and 134 do not permit the flow of fluid therethrough in a reverse direction, motor units 107, 108, 128 and 129 draw fluid from reservoir 14 through suction lines 99, 138 and 142 such that unpressurized fluid is supplied to motor units 107, 108, 128 and 129 which is then pressurized and sent through auxiliary working line 159 to return line 50. Suction lines 99, 138 and 142 also function through check valves 98, 140 and 144 in a similar manner during free wheeling of a vehicle such that, if any given motor is not being directly utilized to drive the vehicle, that corresponding motor unit is permitted to free wheel.

Figure 11:
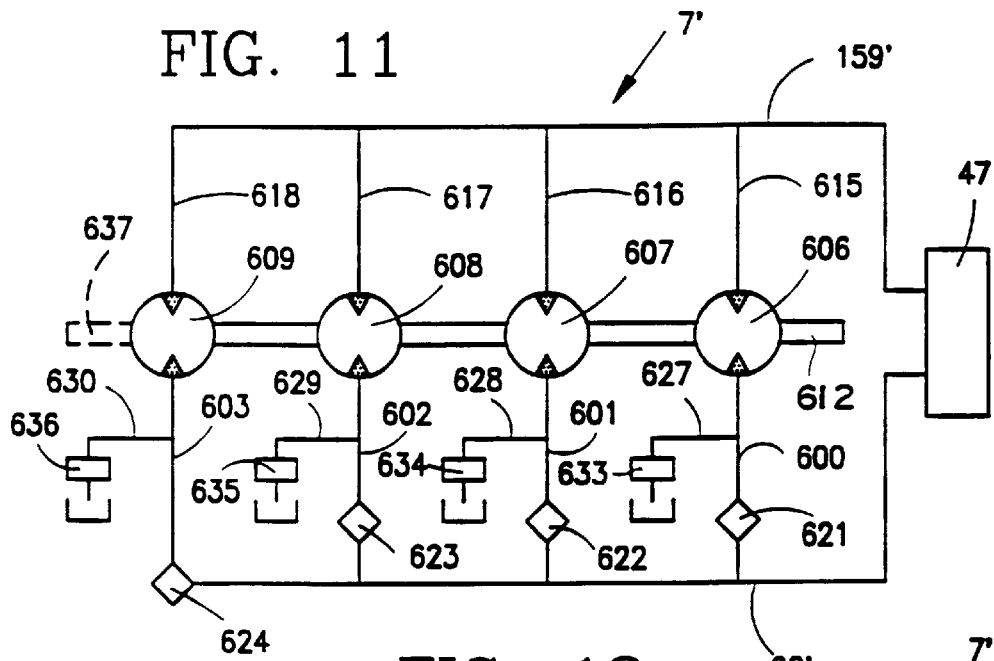
FIG. 11 is a schematic view of another working circuit embodiment in accordance with the present invention.

Reference will now be made to FIG. 11 in describing a second working circuit embodiment that can be readily utilized with the pressure circuit described above. In this working circuit embodiment, main working line 90' has branching off therefrom a plurality of working conduits 600–603 each of which leads to a respective motor unit 606–609 that can be used to drive a common driveshaft 612. Fluid flowing through working conduits 600–603 and motor units 606–609 are directed into respective lines 615–618 and then to auxiliary working pressure line 159'. As in the embodiment described above, auxiliary working pressure line 159' leads to directional flow control valve 47.

As with the above described embodiment, each of the working conduits 600–603 in the embodiment represented in FIG. 11 has arranged therein a respective solenoid valve 621–624 and connected thereto a respective suction line 627–630 between each respective solenoid valve 621–624 and motor unit 606–609. Located in suction lines 627–630 are respective one-way check valves 633–636. In the same manner discussed above with respect to check valves 98, 140 and 144, check valves 633–636 only permit fluid to be drawn from reservoir 14 into the respective motor units 606–609 to maintain complete flooding of the working circuit and to permit free wheeling.

In this embodiment, motor units 606–609 can be automatically controlled individually or in select combinations to drive common driveshaft 612 by controlling solenoid valves 621–624 in a manner directly analogous to that described above with respect to the first embodiment of the invention. Motor units 606–609 can have identical displacements so that they can simply be successively used to supplement the necessary drive torque or the number of motor units 606–609 used to propel the vehicle can be progressively reduced to a minimum number of one motor unit. In the alternative, motor units 606–609 can have different fixed displacements such that, by controlling the activation of solenoid valves 621–624 in various combinations the total displacement of the activated motor units 606–609 used to drive common driveshaft 612 can have a wide range, each of which represents a different drive ratio for the vehicle. Common driveshaft 612 can be used to drive a vehicle wheel set either directly or through a chain or pulley system. Common driveshaft 612 could include a driveshaft extension such as that illustrated at 639 such that this drive arrangement could represent either a front or rear wheel vehicle drive arrangement with each end of the driveshaft being associated with a respective left or right wheel of the vehicle.

Figure 12:
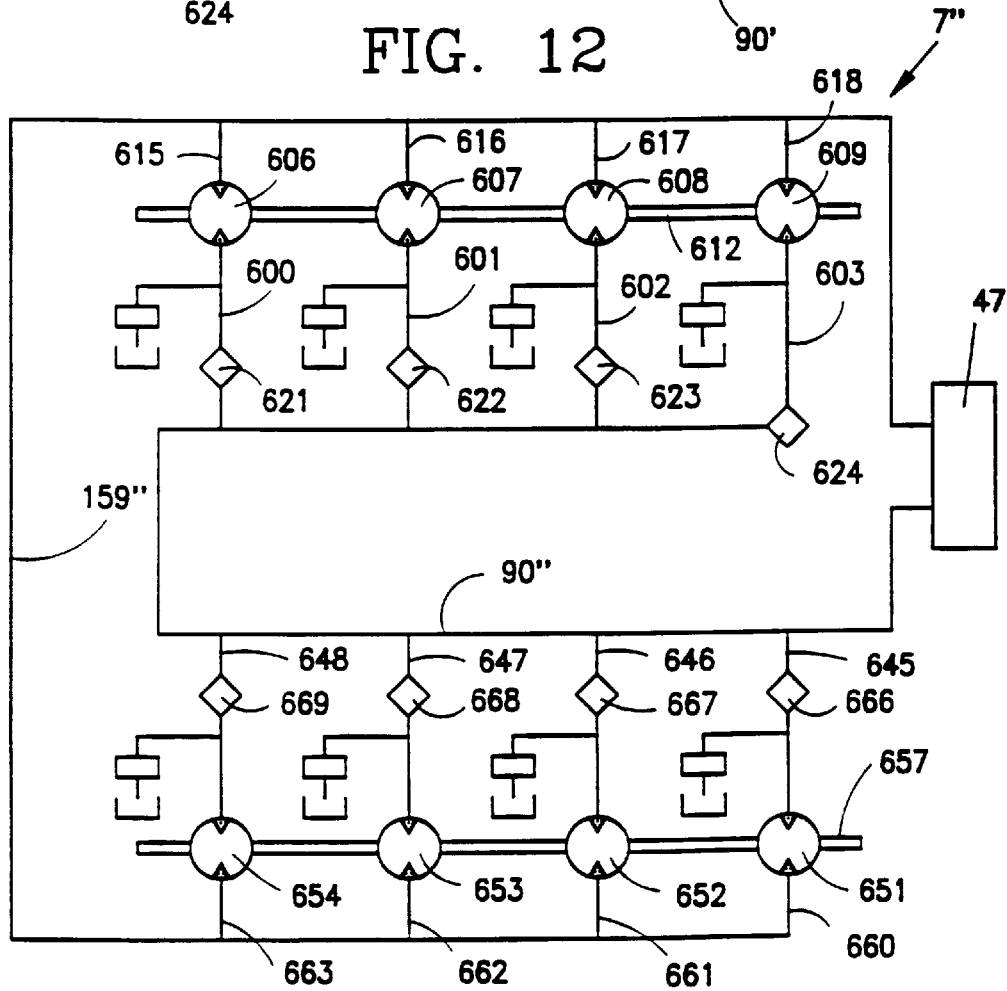
FIG. 12 is a schematic view of a third working circuit embodiment in accordance with the present invention.

FIG. 12 illustrates another working circuit embodiment in accordance with the present invention which is considered to be a modification of the working circuit illustrated in FIG. 11. For this reason, like reference numerals are presented to refer to corresponding parts with respect to these embodiments. Actually, the upper drive section illustrated in FIG. 12 essentially constitutes a mirror image of the drive arrangement illustrated in FIG. 11 and this drive arrangement is connected through a main working line 90" to an identically constructed drive arrangement illustrated in the lower portion of FIG. 12. More specifically, the lower drive portion of FIG. 12 provides additional working conduits 645–648 that lead to additional motor units 651–654 that are associated with a common auxiliary driveshaft 657. Forward drive flow through motor units 651–654 will be directed into lines 660–663 which flow, along with the flow through lines 615–618, into auxiliary working line 159". As with the other embodiments described above, working conduits 645–647 have interposed therein respective solenoid valves 666–669 to control the flow of fluid to respective motor units 651–654. In addition, working conduits 645–648 have interposed between solenoid valves 666–669 and motor units 651–654 respective suction lines that are connected to reservoir 14 through one-way check valves as shown in FIG. 12, however, the suction lines and check valves have not been labeled for clarity of this drawing.

The embodiment of FIG. 12 can be utilized as a drive system for a four wheel drive vehicle wherein driveshaft 612 is associated with driving the front wheels of the vehicle and driveshaft 657 is associated with driving the rear wheels of the vehicle. This embodiment may also be advantageously used in driving tractors for tractor-trailer type vehicles wherein driveshaft 612 can be used to drive one rear wheel set of the tractor and driveshaft 657 can be used to drive the other rear wheel set of the tractor. Again, motor units 606–608 and 651–654 can have identical displacements or the displacements thereof can vary such that the total displacement associated with driving driveshafts 612 and 657 can be greatly varied depending upon the particular motor units activated.

Figure 13:
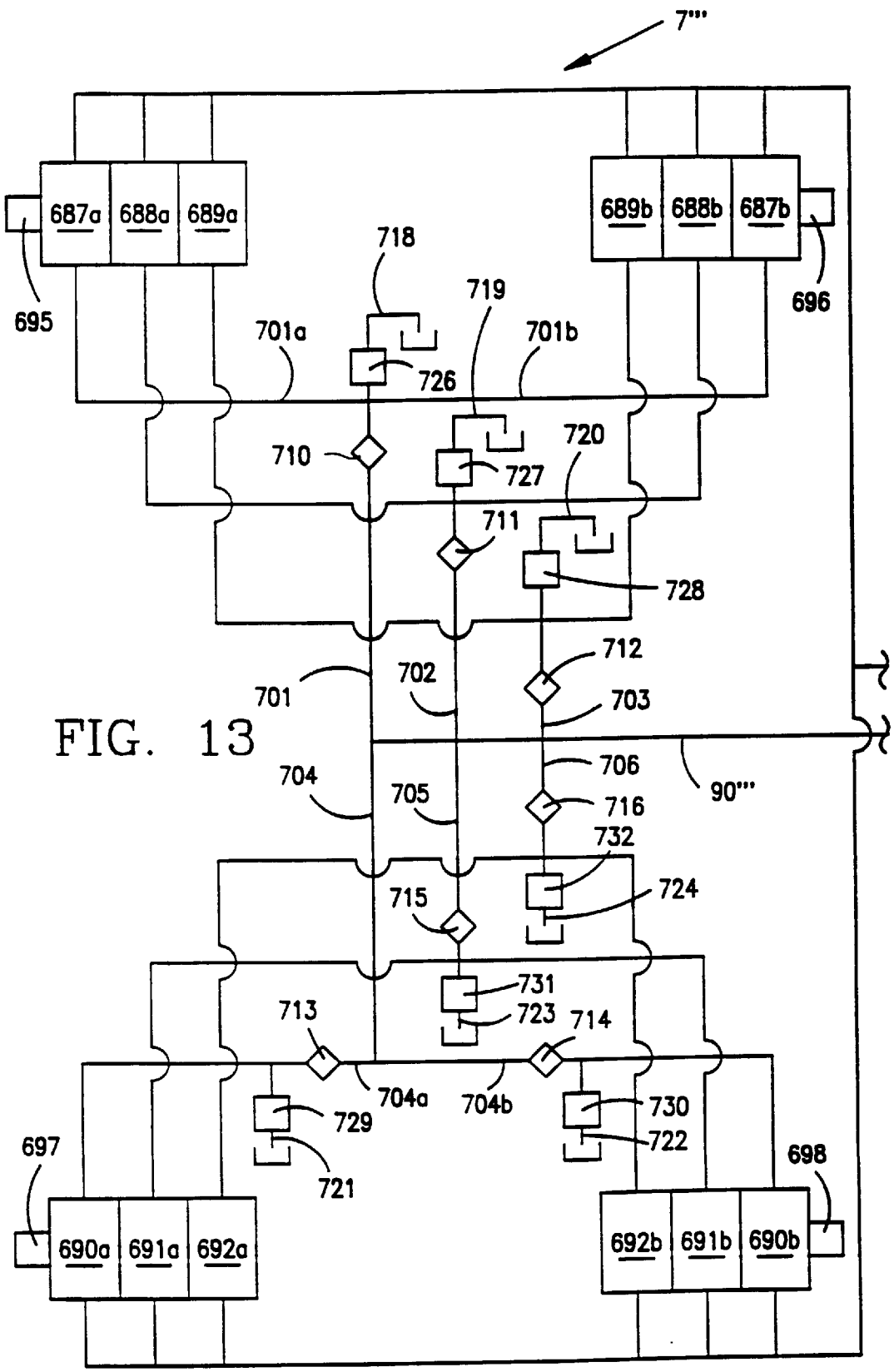
FIG. 13 is a schematic view of a fourth working circuit embodiment in accordance with the present invention.

As indicated above, FIG. 13 represents a fourth working circuit embodiment constructed in accordance with the present invention. This embodiment is seen to be particularly advantageous for use in a hydraulic drive system for passenger vehicles and provides numerous drive ratios to increase the efficiency associated with the vehicle. According to this embodiment, separate motor assemblies are associated with each of the wheels of the vehicle and each one of these motor assemblies, as will be described fully below, actually incorporate multiple, separately operable motor units that preferably have different fixed displacements associated therewith such that the ratio of drive to each of the wheels can be varied based on the combination of motor units selected.

More specifically, this working circuit 7''' incorporates motor units 687a, 687b, 688a, 688b, 689a, 689b, 690a, 690b, 691a, 691b, 692a, 692b. Each motor unit set, such as that represented by motor units 687a, 688a and 689a, have associated therewith a common driveshaft 695–698. As shown, driveshaft 695 will be used to drive the left front wheel of the vehicle, preferably through a half-shaft arrangement. Likewise, driveshaft 696 will be used to drive the right front wheel of the vehicle, drive shaft 697 will be used to drive the left rear wheel of the vehicle and drive shaft 698 will be used to drive the right rear wheel of the vehicle. The supply of pressurized fluid to the various motor units is performed in a manner similar to that described above wherein working conduits 701–706 are arranged in parallel off of main working line 90". Actually, each working conduit 701–706 is bifricated as will be discussed below with respect to working conduit 701 with this description being representative of the flow also through at least working conduits 702, 703, 705 and 706.

Working conduit 701 is connected to main pressure supply line 90''' and then is bifricated to form working conduits 701a and 701b which respectively lead to motor units 687a and 687b. As will be also discussed below with respect to a specific embodiment constructed in accordance with the working circuit 7''' illustrated in FIG. 13, motor units 687a and 687b have the same fixed displacements. The same is true of the other motor units which are arranged in pairs having common fixed displacements. Interposed in working conduit 701, between main pressure supply line 90''' and working conduit 701a and 701b, is a solenoid valve 710. With this arrangement, it should be readily apparent that opening of solenoid valve 710 enables flow from main pressure supply line 90''' to both motor units 687a and 687b. In a similar manner, solenoid valve 711–716 are provided to control the flow of fluid to the other motor units respectively.

In order to enable the drive system to be reduced to a single drive motor driving the vehicle at higher vehicle speeds with little associated resistance to the vehicle, working conduit 704 is bifricated into conduit 704a and 704b and solenoid valves 713 and 714 are provided in working conduits 704a and 704b respectively to separately control the flow of pressurized fluid to motor unit 690a and 690b. All of the motor units illustrated in this embodiment are generally activated in pairs and these pairs have identical fixed displacements. However, although motor unit 690b is activated with motor unit 690a, it is possible to de-activate one of the motor units 690a, 690b through respective solenoid valves 713 and 714 such that only a single one of the motor units is used to propel the vehicle. For instance, when the vehicle is initially moved from a rest position, all of the solenoid valves 710–716 would be open such that fluid is delivered to each of the motor units. Solenoid valves 710–716 could then be controlled based on sensed vehicle parameters such as through the use of pressure sensitive relay switch 83 as described above, to alter the number of motor units actually used to propel the vehicle. In this embodiment, the last set of motor units that would remain operative at higher vehicle speeds would be motor units 690a and 690b. It is preferable to have the rear wheels be the last engaged wheels such that, as another one of the motor units as cut off from the supply of working fluid (such as motor unit 690*b*) and only a single motor unit (such as motor unit 690*a*) is utilized to drive the vehicle, the single motor unit will not be associated with the front wheels so as to prevent pull associated with the steerable wheels. Of course, the final drive gear could equally be defined by two engaged motor units. The charts below present a specific embodiment illustrating exemplary fixed displacements for each of the motors and the manner in which they are successively engaged and disengaged to provide the various drive ratios for a vehicle. However, at this point, it should also be realized that each working conduit 701–706 has associated therewith a respective suction line 718–724 downstream of a respective solenoid valve 710–716 and that respective one-way check valves 726–732 are also provided. Since these suction lines 718–724 and one-way check valves 726–732 are arranged and function in the identical manner set forth above with respect to the other working circuit embodiments, no further description with respect to these embodiments will be provided here. In addition, it should be recognized that each motor wheel set as represented by, for example, by motor units 687*a*, 688*a* and 689*a* are readily available in today's marketplace and are sold by various manufacturers, for example, by PERMCO.

By way of further illustrating the present invention, exemplary fixed displacements for each of the motor units incorporated in one embodiment for the working circuit shown in FIG. 13 and the specific manner in which these motor units are engaged and disengaged in propelling the vehicle are as follows.

CHART I

| MOTOR UNIT | DISPLACEMENT SIZE (in$^3$) |
|---|---|
| 687a | 5.15 |
| 687b | 5.15 |
| 688a | 5.79 |
| 688b | 5.79 |
| 689a | 1.93 |
| 689b | 1.93 |
| 690a | .72 |
| 690b | .72 |
| 691a | .72 |
| 691b | .72 |
| 692a | 1.09 |
| 692b | 1.09 |

CHART II

| GEAR | SOLENOID ACTIVATED | TOTAL DISPLACEMENT (in$^3$ per wheel revolution |
|---|---|---|
| 1 | 710–716 | 30.8 |
| 2 | 711–716 | 20.5 |
| 3 | 712–716 | 8.92 |
| 4 | 713–716 | 5.06 |
| 5 | 713–715 | 2.88 |
| 6 | 713 & 714 | 1.44 |
| 7 | 713 | .72 |

From the above charts, it will be noted that the front wheels are provided with larger motor displacements since these motor units are basically only required during hard acceleration and other extreme operation conditions. In addition, since a major portion of the braking effect for the vehicle is at the front wheels, these larger displacement units will further enhance the regenerative braking of the system. As shown, the front motor units are sequentially engaged and disengaged in pairs to prevent any vehicle pull. In general, the rear motor units are engaged/disengaged in pairs however, the drive system preferably permits reduction to a single drive motor 690*a* as discussed above during higher driving speeds or when required drive torques are rather low. The numerous solenoid valves provide a maximum of seven forward drive ranges and operate in the manner directly analogous to the first disclosed embodiment wherein the solenoids are normally closed but can be opened based on sense system parameters.

Figure 14:
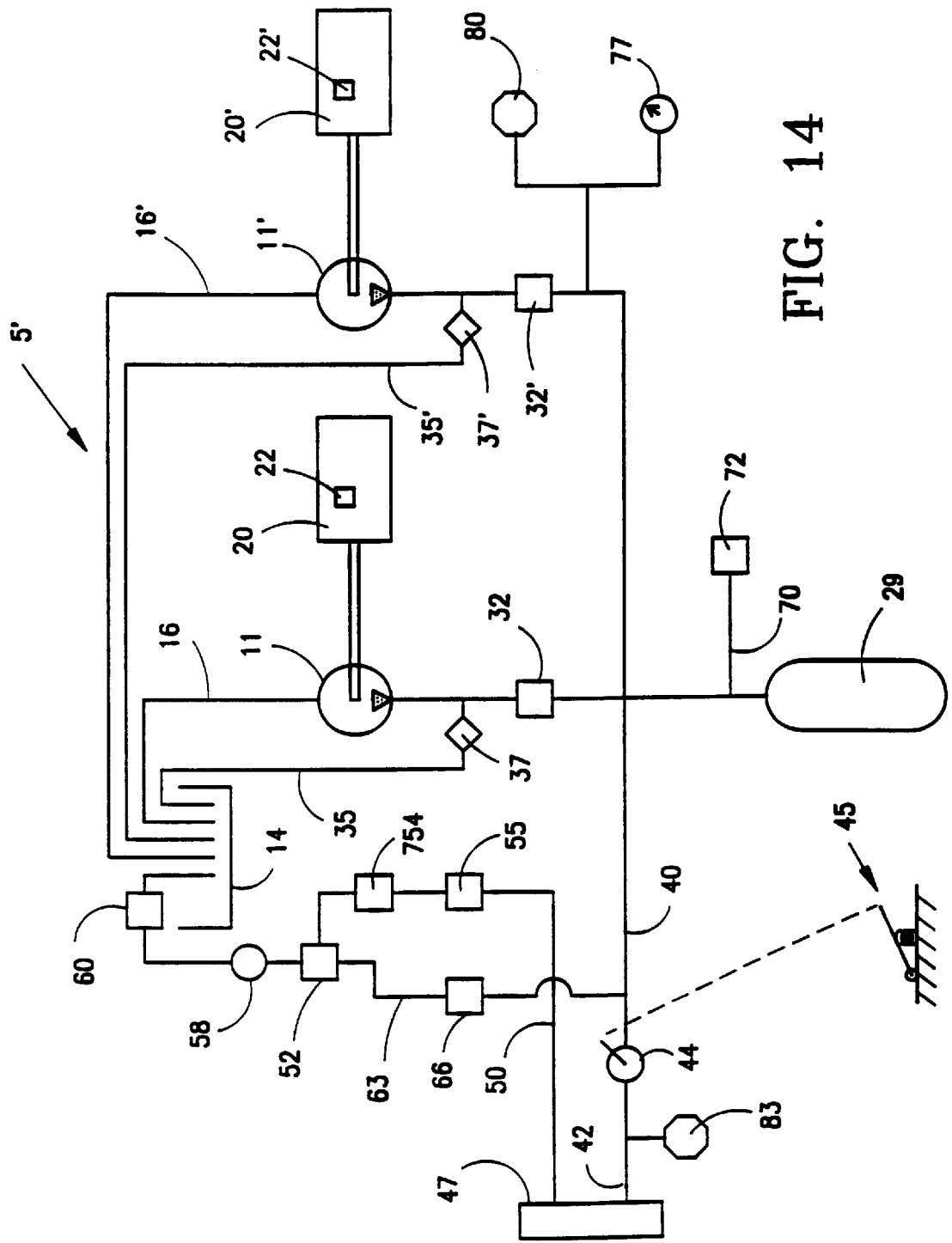
FIG. 14 is a schematic view of a second pressure circuit embodiment in accordance with the present invention.

Finally, reference is made to FIG. 14 in describing another embodiment for the pressurizing circuit incorporated in the present invention. This pressurizing circuit 5' is substantially identical to pressurizing circuit 5 illustrated in FIG. 1 except that an auxiliary pump 11' is provided which receives fluid through inlet line 16' coming from reservoir 14. Pump 11' is driven by prime mover 20' which, in turn, is regulated by regulating unit 22'. The output of pump 11' leads to main pressure supply line 40 through a one-way check valve 32' and also through a bypass line 30' that is controlled by a two-position solenoid valve 37' back to the reservoir 14.

With this arrangement of pressurizing circuit 5', prime mover 20 can be utilized in combination with pump 11 to provide the necessary working fluid for the system during normal running operations and, when the vehicle is utilized under extreme operating loads, for example, such as when climbing a mountain or operating at extremely high speeds and under windy conditions, prime mover 20' can be activated to drive pump 11' to supplement the required amount of working fluid. The control of motor unit 20' can be controlled in the same manner as prime mover 20, i.e. by sensing the pressure through pressure sensitive relay switch 80. In other words, pressure sensitive relay switch 80 would simply trigger prime mover 20 to shift from an idle position to an optimum running condition at a first lower than optimum pressure level and would activate prime mover 20' at an even lower pressure level. In the preferred embodiment, since it is considered that prime mover 20' would not be required under most driving conditions, it is preferable to have prime mover 20' completely turned off when not in use so as to save on fuel consumption. However, prime mover 20' could also be idled. Although not particularly shown in the drawings, it should also be evident that the actual prime mover which is used as the main prime mover can be switched during the life of the vehicle and perhaps periodically to extend the life of prime movers 20 and 20'. This switching of the prime movers can simply be done by minor electrical changes at a central control box associated with the ignition of the vehicle and pressure sensitive relay switch 80.

By way of example, pressurizing circuit 5', when used in combination with the working circuit 5''' illustrated in FIG. 13 and used to drive a rather non-aerodynamic vehicle such as a van, could incorporate twin pumps 11, 11' having fixed displacements of 0.64 in$^3$ in combination with two prime movers 20, 20' having horsepower ratings of approximately 18 hp. Of course, these numbers are only being presented for exemplary purposes and would vary depending upon the weight and aerodynamic properties of the vehicle and the performance characteristics desired. In addition, the actual pressure range utilized can also be readily varied depending upon the type of vehicle being propelled. Furthermore, the prime movers 20 and 20' could be controlled to operate at a third speed which represents the highest potential horsepower output thereof if operating conditions required the additional flow of working fluid. Obviously, the exact system parameters would have to be designed to the specific vehicle characteristics and range.

A second major change in the pressurizing circuit 5' is the inclusion of a flow control valve 754 between re-directing valve 52 and solenoid valve 55. This flow control valve 754 is used to increase the resistance pressure experienced by the wheel motor units during extreme braking conditions. Therefore, not only can the wheel motor units experience system pressure within the operating pressure range of the pressurizing circuit, a higher resistance pressure can be experienced by the wheel motor units by restricting the flow through flow control valve 754 during extreme braking conditions.

From an operator standpoint, a vehicle incorporating the hydraulic drive system of the present invention appears to be constructed and operates in an identical manner to a vehicle incorporating a conventional drivetrain. In other words, the vehicle operator would not even necessarily perceive a difference in the manner in which the vehicle is controlled. Therefore, the system is user-friendly with the operator controlling the steering, gear shifting lever, speed/acceleration control member and brake pedal in a conventional manner.

At this point, it should be realized that various other vehicle operating parameters could be sensed and used to control the number of motor units used to propel the vehicle and the operation of the prime mover(s). Since the system is based on volume and the pressure need only be maintained in a desired range in accordance with the invention, it should be readily apparent that volume sensors could be utilized. For instance, instead of sensing the available working fluid pressure, the volume of available working fluid in accumulator 29 could be sensed and the prime mover(s) could be controlled to maintain this volume in a desired range. Likewise, the volumetric flow through flow control valve 44 could be measured and, in combination with other vehicle parameters such as vehicle speed, could be used to control the specific motor units-used to propel the vehicle at any given time. Clearly, if you know the speed of the vehicle and the volumetric capacity that needs to flow through the working circuit, these parameters can be utilized to readily control the motor units engaged. Other vehicle parameters can also be utilized. For example, an accelerator position sensor could provide information corresponding to the volumetric flow through flow control valve 44 and vehicle acceleration and wheel torque sensors could also be utilized to provide the necessary information to control the number of engaged motor units. In addition, it should be readily apparent that other types of valving arrangements, including sequence valves, could be used in place of the various solenoid valves as such other types of valving arrangements are widely known in the art.

Therefore, although described with respect to preferred embodiments of the invention, it should be readily understood that various changes and/or modifications can be made to the hydraulic drive system of the present invention without departing form the spirit thereof. In general, the invention is only intended to be limited by the scope of the following claims.

I claim:

1. A fluid drive system in a vehicle comprising:
   a prime mover including a rotatable driveshaft;
   an adjustable vehicle control member;
   a reservoir for maintaining a supply of working fluid;
   a working circuit including:
      a plurality of fluid motors, each of said motors being drivingly connected to at least one wheel of the vehicle and including first and second fluid ports;
      a first working conduit system fluidly connecting to the first fluid port of each of said motors, said first working conduit system including a main working pressure line;
      a second working conduit system fluidly connected to the second fluid port of each of said motors, said second working conduit system terminating, within said working circuit, in a common, auxiliary working pressure line;
      motor control valve means interposed between said motors and at least one of said main and auxiliary working pressure lines for establishing fluid communication between at least one of said motors and at least one of said main and auxiliary working pressure lines in a working position and interrupting fluid communication between said motors and said at least one of said main and auxiliary working pressure lines in an isolating position, wherein said plurality of fluid motors are arranged with respect to said first and second working conduits, parallel to one another and at least two of said plurality of fluid motors are drivingly connected to a common output shaft, said common output shaft being drivingly connected to at least one wheel of the vehicle;
   a pressurizing circuit including:
      a pump drivingly coupled to the driveshaft of said prime mover, said pump including an inlet in fluid communication with said reservoir and an outlet;
      an accumulator in fluid communication with the outlet of said pump;
      a main pressure supply line in fluid communication with said accumulator, said main pressure supply line including a terminal portion located downstream of said accumulator;
      an adjustable flow control valve located in said main pressure supply line downstream of said accumulator, said adjustable flow control valve being linked to said adjustable vehicle control member such that selective movement of said adjustable vehicle control member repositions said adjustable flow control valve;
      directional flow control valve means interconnected between said main pressure supply line, said main working pressure line, said auxiliary working pressure line and said reservoir for controlling the flow of working fluid between said working and pressurizing circuits; and
   means for shifting said motor control valves means between said working and isolating positions.

2. The fluid drive system according to claim 1, further comprising a check valve unit interposed between said reservoir and a respective one of said plurality of motors.

3. The fluid drive system according to claim 1, wherein said directional flow control valve means comprises a multi-position valve having a first position connecting said main pressure supply line with said main working pressure line and said auxiliary working pressure line with said reservoir; a second position isolating said working circuit from said main pressure supply line; and a third position interconnecting said auxiliary pressure supply line and said main working pressure line while fluidly interconnecting said main working pressure line and said reservoir.

4. The fluid drive system according to claim 1, further comprising an operator controllable shift lever adapted to position said directional flow control valve means.

5. The fluid drive system according to claim 1, wherein said shifting means includes a first pressure sensitive-relay for detecting an operating pressure downstream of said adjustable flow control valve.

6. The fluid drive system according to claim 1, further comprising a second pressure sensitive relay for detecting an operating pressure in said main pressure supply line and a regulating unit for controlling an operating speed of said prime mover, said regulating unit being responsive to a pressure detected by said second pressure sensitive relay unit.

7. The fluid drive system according to claim 1, wherein said pressurizing circuit further includes a return line interconnected between said reservoir and said directional flow control valve means, a flow re-directing valve arranged in said return line and an auxiliary pressure supply line interconnected between said main pressure supply line and said flow re-directing valve.

8. The fluid drive system according to claim 1, wherein said pressurizing circuit further comprises a bypass loop directly interconnecting a portion of said pressurizing circuit, between said pump and said accumulator, and said reservoir and a bypass valve arranged in said bypass loop, said bypass valve being shiftable to selectively permit a flow of working fluid through said bypass loop and prevent the flow of working fluid through said bypass loop.

9. The fluid drive system according to claim 1, further comprising operator controlled system over-ride means for selectively, positively maintaining a desired number of said motors in operation.

10. The fluid drive system according to claim 1, wherein a first set of said plurality of fluid motors are drivingly connected to a first common output shaft used to convey driving power to a front set of vehicle wheels and a second set of said plurality of fluid motors are drivingly connected to a second common output shaft used to convey driving power to a rear set of vehicle wheels.

11. The fluid drive system according to claim 1, wherein a set of said plurality of fluid motors is individually drivingly connected to a predetermined wheel of the vehicle.

12. A fluid drive system in a vehicle comprising:
   a plurality of fluid, wheel driving motors, with at least two of said plurality of fluid motors being drivingly connected to at least one common wheel of the vehicle;
   motor control valve means for controlling a number of said plurality of fluid motors used to drive the vehicle;
   a prime mover including a rotatable driveshaft;
   a regulating unit adapted to control an operating speed of said prime mover;
   a reservoir housing a source of working fluid;
   a pump drivingly coupled to the driveshaft of said prime mover, said pump being in fluid communication with said source of working fluid and a pressurizing circuit leading to said plurality of fluid motors;
   a flow control valve interposed in said pressurizing circuit between said pump and said plurality of fluid motors;
   a first relay unit for detecting a first operating condition of said fluid drive system associated with an available amount of working fluid in said pressurizing circuit between said pump and said flow control valve and signalling said regulating unit to control the operating speed of said prime mover; and
   a second relay unit for detecting a second operating condition of said fluid drive system associated with a flow of working fluid through said flow control valve to said plurality of fluid motors and signalling the second operating condition to said motor control valve means to control the number of said plurality of fluid motors used to drive the vehicle.

13. The fluid drive system according to claim 12, further comprising an accumulator interposed in said pressurizing circuit between said pump and said flow control valve for storing a supply of pressurized working fluid.

14. The fluid drive system according to claim 13, further comprising a manually adjustable vehicle control member, said vehicle control member being linked to said flow control valve such that said flow control valve is shifted in dependence upon movement of said vehicle control member.

15. The fluid drive system according to claim 14, further comprising a plurality of one-way check valve units, each of said check valve units being interposed in a line between said motor control valve means and a respective one of said plurality of fluid motors and interconnecting said line and said reservoir, each of said check valves permitting flow from said reservoir to said line but preventing flow from within said line directly to said reservoir.

16. A method of operating a vehicle driven by a plurality of fluid, wheel driving motors of the vehicle comprising:
   driving a pump by a prime mover to develop working pressure;
   storing developed working pressure in an accumulator;
   supplying a flow of the developed working pressure to each of said plurality of fluid motors in a first drive range;
   progressively shifting to higher drive ranges by successively decreasing the number of said plurality of fluid motors used in driving the vehicle; and
   reaching a highest drive range when only a single one of said plurality of fluid motors is driving the vehicle.

17. The method of operating a vehicle according to claim 16, further comprising controlling an operating speed of said prime mover based solely on the working pressure by idling said prime mover when the working pressure is within a predetermined acceptable pressure range and increasing the operating speed of said prime mover to a predetermined higher rate when the working pressure is outside of said predetermined acceptable pressure range.

18. A method of operating a vehicle driven by a plurality of fluid, wheel driving motors comprising:
   driving a pump by a prime mover to develop an output flow of working pressure into a fluid line leading to the plurality of fluid motors;
   providing an adjustable flow control valve in said fluid line between said pump and the plurality of fluid motors;
   sensing a first pressure in said fluid line between said pump and said flow control valve;
   sensing a second pressure in said fluid line between said adjustable flow control valve and the plurality of fluid motors;
   controlling an operating speed of said prime mover based on the sensed first pressure; and
   controlling the number of plurality of fluid motors used to drive the vehicle based on the sensed second pressure.

* * * * *